Oct. 22, 1963 V. P. GOLDEN 3,107,507
PERMANENT MAGNET CLUTCH FOR ALTITUDE CONTROLLER
Filed April 20, 1959 3 Sheets-Sheet 3

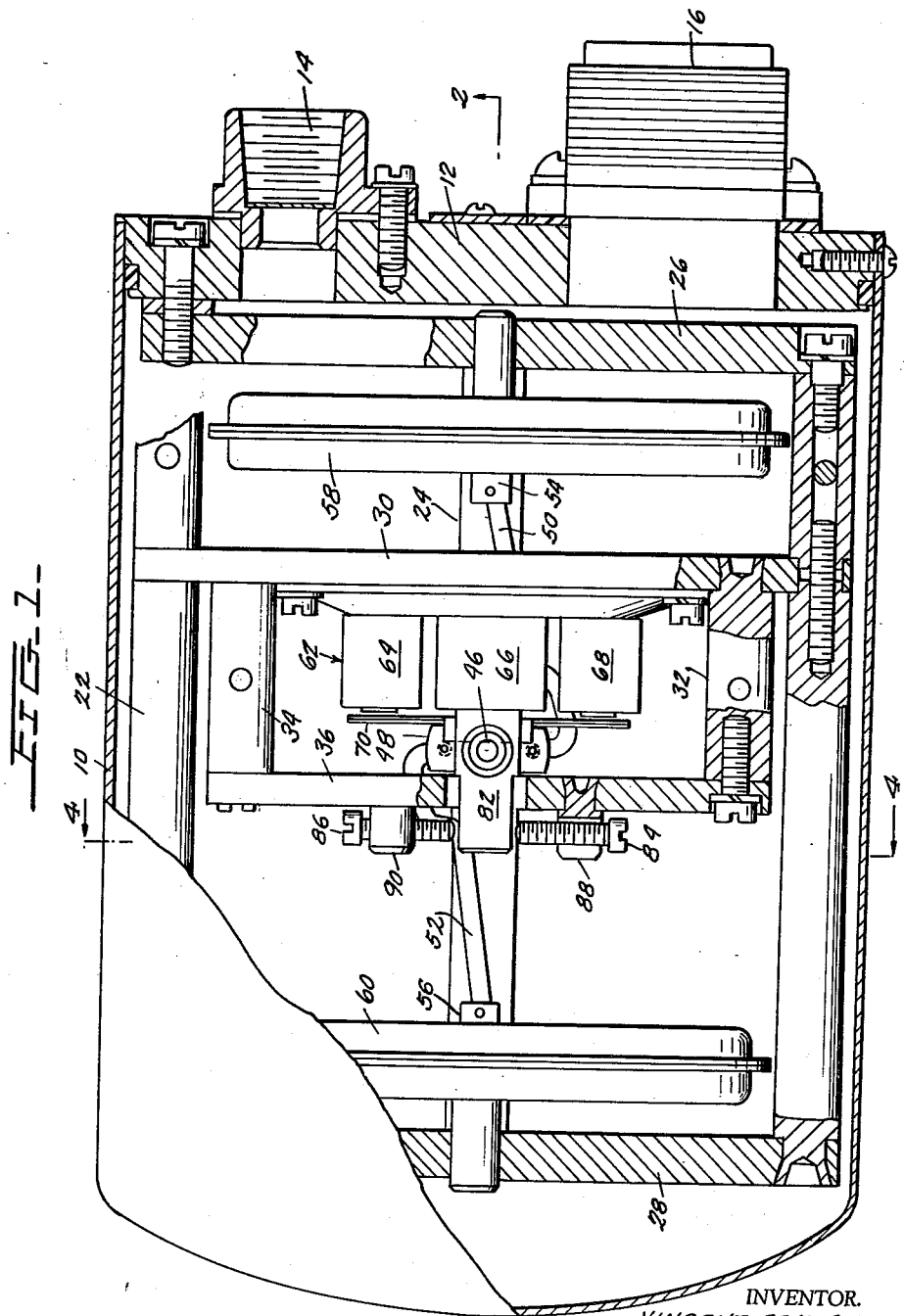

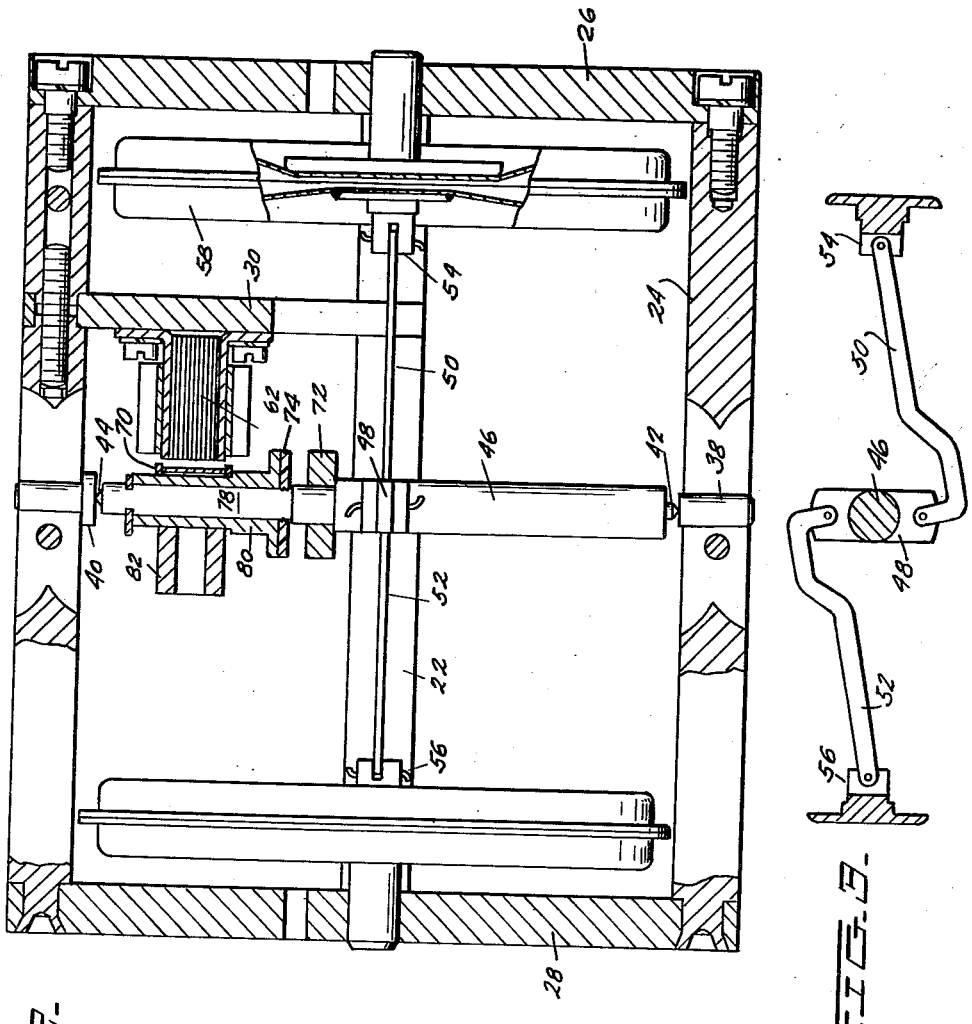

INVENTOR.
VINCENT PAUL GOLDEN
BY
ATTORNEYS

United States Patent Office 3,107,507
Patented Oct. 22, 1963

3,107,507
PERMANENT MAGNET CLUTCH FOR ALTITUDE CONTROLLER
Vincent Paul Golden, Ozone Park, N.Y., assignor to Kollsman Instrument Corporation, Elmhurst, N.Y., a corporation of New York
Filed Apr. 29, 1959, Ser. No. 807,489
2 Claims. (Cl. 64—30)

This invention relates to a holding controller for aircraft in which a predetermined parameter is automatically held at a specified value.

Controllers of the type to which this invention is directed are well-known in the art, and are used for maintaining a predetermined altitude, airspeed or mach number. In the present application, the controller will be illustrated for the case of an altitude controller.

These devices are generally interposed between an altitude measuring device and an automatic altitude control device such as the well-known autopilot which automatically controls the aircraft's control surfaces in response to input error signals. Thus, it is well-known to provide a diaphragm capsule operated mechanism which positions a shaft as a function of altitude. When the desired altitude is attained by the aircraft, a clutch is engaged to tie the mechanism to a centered electrical pick-off, such as an "E" type of pick-off or synchro, with the output of the pick-off connected to an automatic altitude control mechanism. If the airplane now goes above or below the altitude at which the automatic controller was connected, appropriate corrective signals are generated, and the aircraft returns to the preset altitude.

Other types of systems are well-known, such as a device in which an altitude sensitive mechanism is connected directly to one side of an electrical pick-off. Error signals from the pick-off are fed to a servo system which attempts to drive the other half of the pick-off to a null position. When the desired altitude is reached, the pick-off error signal from the servo amplifier is connected into the autopilot pitch control circuit, and the servo motor is stopped. Thus, the servo motor automatically maintains a reference position from which error signals may be measured when the desired altitude is reached.

Still another type of altitude controlling mechanism utilizes pneumatic means where one side of the pressure sensing diaphragm is directly connected to static pressure, while the other side is connected to a reference volume of air which is, in turn, connected through a valve to the static pressure. Once the desired altitude is reached, the valve which normally connects the static and reference volumes of air is closed so that a differential pressure of the proper sense will be developed when the aircraft goes above or below the predetermined altitude. This difference is sensed in the pick-up which generates corrective signals to the autopilot.

In each of the above noted types of systems, relatively complex mechanisms are required, such as servo mechanisms, complex pneumatic structure and complex clutches. Furthermore, once the preset altitude is set and drives the autopilot, it is difficult to over-ride the automatic pilot by manual control. This is because the mechanisms will "give" only prior to that point which would cause prohibitive mechanical stresses in their components.

Furthermore, where there are large altitude changes from the predetermined altitude, large corrective signals are generated which may cause violent changes of the aircraft control surfaces and cause a loss of control of the aircraft.

The principle of this invention is to provide a novel controller device which can be always connected in the automatic pilot circuit and can be easily over-ridden by manual control. Structurally, a pressure sensing mechanism is connected to an error signal generating structure through a slip clutch having a very light controllable maximum torque. Adjustable stop means are provided on the output side of the clutch which prevent motion of the error signal generating means once the pressure measuring mechanism moves through a predetermined distance. Thus, when the aircraft reaches a predetermined altitude, that altitude will be maintained within limits given by the position of the stops and the very light torque of the clutch. That is to say, when a reference value is reached and the aircraft altitude increases, the pressure sensing mechanism will cause motion of the error signal generator means which is transmitted through the clutch. So long as this motion is due to an altitude change within a predetermined range, the error signal generated will cause the automatic pilot to return the aircraft to its predetermined altitude.

However, if the change in altitude is so large that a stop is reached and further motion generates a torque larger than the torque rating of the clutch, the clutch will slip because the stop means is engaged, and there will be no increase in the error signal generated to the autopilot.

In a typical example, mechanical stops are provided on the pick-off error signal generating means at some small increment of altitude such as 50 feet above and below the null position. If the aircraft makes a 50 foot change in altitude, the pick-off will be driven from a null position to a maximum output position as determined by the stop means. After a further change in altitude in the same direction, depending upon the torque transmitting capacity of the clutch, such as 30 feet in this example, the clutch will slip.

In setting the instrument, if the aircraft has been climbing and the pilot switches the pick-off signal to the autopilot when a particular height is reached, a "go-down" signal corresponding to the 50 foot stop setting will be given to the autopilot. As the airplane descends for 30 feet, however, the signal will remain at full "down" value, as the stress in the mechanism working against the friction clutch is relaxed. With the next 50 feet downward, the signal will gradually reduce to null after the pick-off leaves the stop position.

Accordingly, if the control is engaged after a climb, the airplane will descend 80 feet and hold altitude, or if in a descent, it will climb 80 feet and hold altitude. In flight, this 80 foot change will have the effect of shortening the time for the aircraft to reach its equilibrium or trim airspeed.

Accordingly, a primary object of this invention is to provide a novel altitude controller which is simple in construction, highly reliable, has low weight and low cost.

Another object of this invention is to provide a novel controller mechanism which can readily be left in the autopilot circuit at all times, if desired, and can be over-ridden by manual controls of the aircraft or by a manually inserted electrical signal when an altitude change is desired.

Another object of this invention is to provide a novel altitude controller wherein a large change in altitude, due to the autopilot's inability to cope with a condition will cause the controller to seek a new altitude, rather than attempt to return to the old reference within a value determined by stop means plus the torque capacity of a clutch.

Another object of this invention is to provide a novel altitude control mechanism which includes a combined pressure measuring mechanism which is connected to an electrical signal generating mechanism through a clutch having a relatively light controllable torque capacity.

As seen above, one of the more important elements of the structure involves a light, easily controllable low torque capacity clutch. It has been found that such a low friction clutch can be obtained by positioning a permanent magnet in spaced relation with respect to a magnetic structure so that the magnetic structure is biased towards engagement with a torque transmitting member. Thus, a first shaft carrying the first torque transmitting member may be positioned to be engaged by a second shaft carrying the magnetic member. The position of the permanent magnet or the position of either of the cooperating clutch members may then be controlled so that the permanent magnet will drive the magnetic member into engagement with the friction member in a controllable manner.

This structure leads to a highly accurate low torque capacity clutch system which is of extreme simplicity and low weight.

Accordingly, a further object of this invention is to provide a novel low torque capacity, low weight clutch.

Another object of this invention is to provide a novel low torque capacity clutch in which the clutch elements are biased towards one another by a permanent magnet.

These and other objects of this invention will become apparent from the following description when taken in connection with the drawings, in which:

FIGURE 1 is a side cross-sectional view of the controller of this invention shown as an altimeter in conjunction with its housing.

FIGURE 2 is a cross-sectional view of FIGURE 1 taken across the lines 2—2 with the housing removed.

FIGURE 3 is a partial side cross-sectional view of the manner in which the pressure sensing elements drive the shaft of the device of FIGURES 1 and 2.

Figure 4:
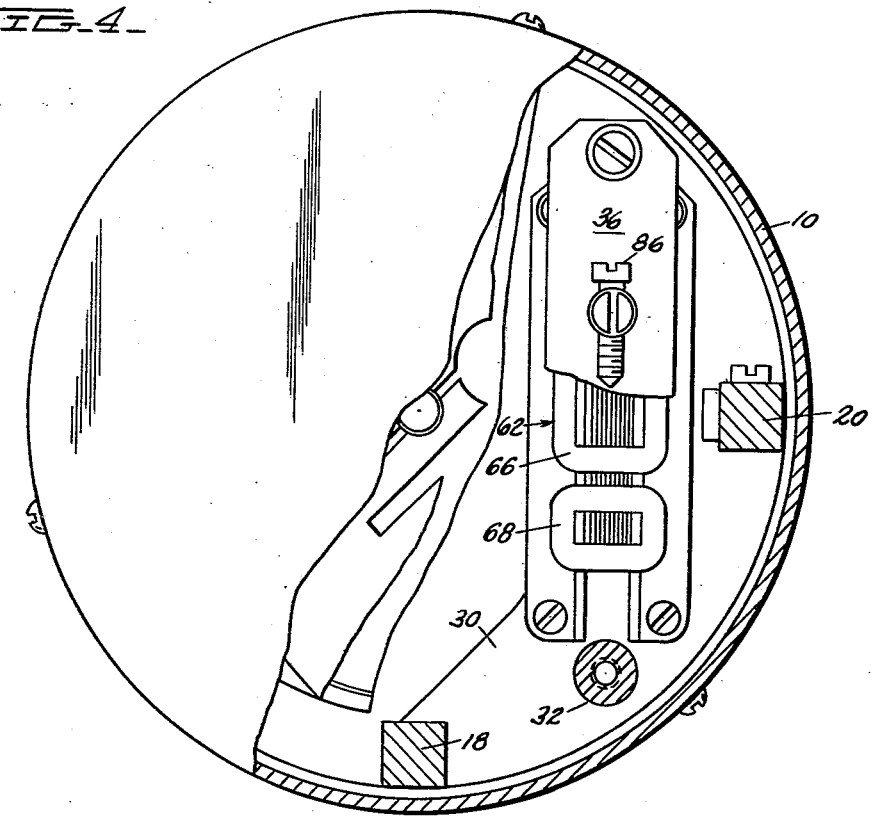
FIGURE 4 is a partial side cross-sectional view of FIGURE 1 taken across the lines 4—4.

Referring first to FIGURE 1, the controller is generally contained within a container 10 having a base portion 12 which contains outlets 14 and 16 for supplying pneumatic and electrical connections to the instrument.

The instrument is generally supported on four posts 18, 20, 22 and 24. The posts 18, 20, 22 and 24 are generally supported on platforms 26 and 28 which receive the posts in the screw type engagement, as best seen in FIGURE 2. The posts further act as supports for receiving intermediate platform 30, as seen in FIGURES 1, 2 and 4, where platform 30 has a general crescent shape with the two extremities and a central portion being received by a necked-down portion of shafts 18, 20 and 22 respectively.

Platform 30, as will be seen more fully hereinafter, operates to support the electrical pick-off structure and has support legs 32 and 34 projecting therefrom, as seen in FIGURES 1 and 4, which support a second platform 36 at their upper end, which carries the stop members to be described hereinafter.

Each of the posts 20 and 24 carry pivotal shaft mounting members 38 and 40 which receive the protruding portions 42 and 44 respectively of shaft 46 which serves as an input clutch member. Thus, shaft 46 is pivotally mounted in a substantially frictionless manner, as is well known in the art, through the use of a bearing type engagement between members 44 and 40 and members 42 and 38.

A central portion of shaft 46 has an extending crank arm 48, as seen in FIGURES 1 and 3, where crank arm 48 receives a first link 50 at its lower end with respect to FIGURE 1 and a second link 52 at its upper end. Links 50 and 52 have their other ends connected to boss structures 54 and 56 respectively of diaphragms 58 and 60 respectively, as seen in FIGURES 1 and 2. Accordingly, when the diaphragms 58 and 60, which may be evacuated, are exposed to changes in pressure due to changes in altitude, they will expand or contract so as to cause rotation of crank arm 48, and thus a rotation of shaft 46 which is rigidly secured to crank arm 48.

As stated above, platform 30 carries the pick-off structure to be utilized in accordance with this invention. For illustrative purposes, the pick-off structure is shown herein to comprise an E-I type of structure.

However, it will be apparent to those skilled in the art that a potentiometer type of pick-off could be used.

Thus, platform 30 carries the E portion 62 of the pick-off structure. This E portion is comprised of a laminated magnetic structure having a general E shape formed by three projecting legs with a common end yoke. Each leg of the E structure is provided with a winding seen as windings 64, 66 and 68 respectively in FIGURES 1 and 4. The I portion of the structure 70, best seen in FIGURES 1 and 2, is positioned to span each of the three legs of the E member.

It is clear that electrical circuitry may be easily provided wherein a clockwise rotation of I member 70 of FIGURE 1 may be converted into a positive electrical signal with respect to some null position in which the I piece is equidistant from each of the legs, while a counter-clockwise rotation of I piece 70 may be converted into a negative signal with respect to the null position.

Figure 5:
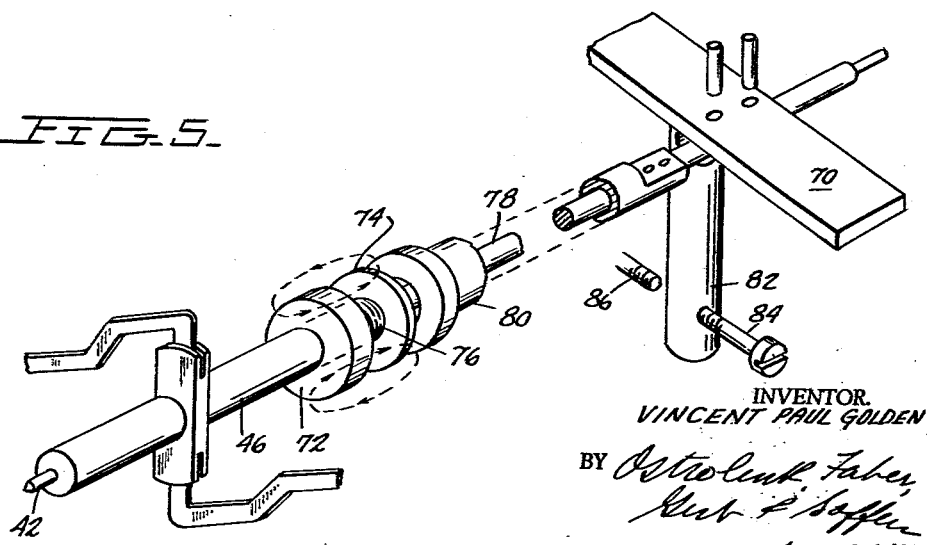
FIGURE 5 is an exploded perspective view and shows the manner in which the shaft of the controller of FIGURES 1 and 2 carries a low torque capacity clutch and the I of an E-I pick-off element.

The manner in which I piece 70 is driven by shaft 46 is best understood from FIGURES 1, 2 and 5 which show the specific structure of the shaft. Referring to FIGURE 2 it is seen that the shaft 46 carries a permanent magnet member 72 in such a manner that the magnet 72 rotates with shaft 46. This rigid securing may be accomplished in any desired manner.

A friction washer 74 is positioned in spaced relation with respect to magnet 72, the washer 74 being of any desired material having some predetermined coefficient of friction. If desired, the washer 74 may be threadably secured on shaft 46, as indicated by threads 76 of FIGURE 5, so that the position of washer 74 with respect to permanent magnet 72 is adjustable. Washer 74 may otherwise be fastened to magnet 72 or to shaft 46.

The shaft 46 then continues in a necked-down portion 78 which extends through a magnetic sleeve 80 having an internal diameter slightly greater than the external diameter of shaft section 78 whereby the magnetic sleeve 80 is capable of rotational movement with respect to shaft portion 78 and serves as the output member of the device. The upper end of sleeve 80 has a flattened portion, as best seen in FIGURE 5, with this flattened portion rigidly receiving I piece 70 in any desired manner so that I piece 70 rotates with the sleeve 80. Sleeve 80 further has a section 82 protruding therefrom which cooperates with a stop means. Section 82 may be made of any desired material.

The stop means or stop members are formed by screws 84 and 86 which, as seen in FIGURE 1, are carried by threaded brackets 88 and 90 respectively, which are carried by platform 36. As shown in FIGURES 1 and 4, screw 86 and, in a similar manner screw 88 (not seen in FIGURE 4), are positioned to permit only a predetermined motion of extension 82 about its pivot, which is the axis of shaft 46.

In operation, permanent magnet 72 exerts a predetermined downward force on magnetic sleeve 80 so as to drive the face of magnetic sleeve 80 into engagement with the adjacent face of washer 74. This provides a highly controlled low torque capacity clutching means for transmitting torque from shaft 46 to the sleeve 80.

If the torque is to be increased, this is easily accomplished by bringing washer 74 closer to the permanent magnet 72, and, conversely, the torque may be decreased by moving the two members further apart. Similarly, washer 74 may be made thicker to achieve torque calibration.

In a further embodiment of this invention, friction washer 74 is not necessarily made adjustable and indeed may not be used at all. Thus, the flange on sleeve 80 may directly contact the face of a washer such as washer 74 or it may directly contact the face of magnet 72. In either of these cases, the torque friction is controlled by setting the magnetization of magnet 72 at some desired value.

Assuming that a predetermined altitude is to be attained by the aircraft containing the controller of the figures, the combined output of coils 64 and 68 is taken to the pitch control of the autopilot. By way of example, the output of each coil may be connected in series opposition with respect to one another.

When the pilot manually causes the aircraft to rise the diaphragms 58 and 60 expand to rotate shaft 46 in a clockwise direction with respect to FIGURE 1 so that the upper portion of I piece 70 comes closer to the leg carrying coil 64 than the leg carrying coil 68.

As the aircraft continues to rise, the shaft 46 rotates to a maximum position as determined by stop 86 which receives extension 82 of sleeve 80. Thus, the I piece 70 can no longer rotate. However, the continued expansion of diaphragms 58 and 60 will soon impart a sufficient torque to shaft 46 so that the frictional engagement between washer 74 and magnetic sleeve 80 is overcome, whereby the shaft 46 begins to rotate independently of sleeve 80 with the clutch members slipping.

Accordingly, some positive voltage of a predetermined maximum magnitude is induced from the input coil 66 to coil 64, while a relatively lower voltage is induced in coil 68. The difference in these two voltages is some positive voltage which is the output error signal of the system. If the aircraft cannot respond correctly and continues to depart from the reference altitude after the stop has been reached and exceeded by some amount of altitude, the clutch will slip.

Note that while the clutch slippage occurs a new level is constantly assumed by the altitude controller. That is to say, if the climb is stopped by the pilot at some height slightly greater than the height he wishes to maintain, the maximum signal generated by the E-I pick-off will cause the aircraft to begin to descend. This descent will be under the influence of the maximum signal until the torque capacity of the clutch formed by the permanent magnet 72, washer 74 and sleeve 80 is attained, at which time slippage stops and actual rotation of shaft 46 begins. Thus, I piece 70 begins to move to its equilibrium position, whereupon it is positioned equidistant from each of the legs containing coils 64 and 68 respectively, and there is a zero output signal.

From the foregoing description, it will now be realized that the use of a low torque capacity clutch in combination with the pick-off and pressure sensing mechanism leads to an extremely simple, reliable instrument having low weight and high economy.

If the mechanical stops in the controller and the constants of the autopilot circuits are chosen so that the pilot can readily take over control, even though the altitude controller remains in the autopilot circuit, the controller can be left in the autopilot circuit at all times with the pilot overcoming its signal either by force, if desired, or by supplying a biasing signal to the pitch servo of the autopilot when an altitude change is desired.

Furthermore, since only a predetermined maximum signal can be generated by the pick-off, a large change in altitude which cannot be handled by the autopilot will not cause excessively large return signals to the autopilot which could result in a loss of control of the aircraft.

It is to be particularly noted that the device of the present invention requires a clutch having substantially no friction during normal controlling operation, and a small controlled friction during relatively large changes, so that a new reference level may be set which is not excessively far from the existing level.

The permanent magnet arrangement for generating the clutch force is ideally suited for this purpose in combination with the stop structure, and before the stops are reached, the only friction of the system is that at the bearing surfaces supporting the shaft.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

I claim:

1. A clutch having an accurately controlled low torque capacitor comprising a rotatable shaft, a magnetic member rotatable with respect to said shaft, a friction member rotatably secured to said shaft and being positioned adjacent said magnetic member, and a permanent magnet; said permanent magnet being rotatably secured to said shaft; said friction member being disposed between said permanent magnet and said magnetic member, said magnetic member being permanently engaged with said friction member due to the force of attraction between said magnetic member and said permanent magnet; the axial position of one of said permanent magnet or said frictional member along said shaft being adjustable to a constant position to adjust the engaging force between said friction member and said first magnetic member.

2. The device as substantially set forth in claim 1, wherein said magnetic member comprises a sleeve of magnetic material concentrically positioned on said shaft; said sleeve having a radially extending end portion engaging said friction member.

References Cited in the file of this patent

UNITED STATES PATENTS

| | | |
|---|---|---|
| 517,831 | Arnold | Apr. 10, 1894 |
| 741,895 | Earll | Oct. 20, 1903 |
| 2,796,160 | Harmes | June 18, 1957 |
| 2,823,776 | Pierce | Feb. 18, 1958 |
| 2,863,320 | Mendenhall | Dec. 9, 1958 |
| 2,875,876 | Rudisch | Mar. 3, 1959 |
| 2,954,859 | Rabinow | Oct. 4, 1960 |
| 2,956,658 | Jaeschke | Oct. 18, 1960 |
| 2,962,144 | Heinemann et al. | Nov. 29, 1960 |

FOREIGN PATENTS

| | | |
|---|---|---|
| 721,748 | Great Britain | June 1, 1951 |
| 1,182,736 | France | June 29, 1959 |